(12) United States Patent  (10) Patent No.: US 7,605,929 B2
Erfling et al.  (45) Date of Patent: Oct. 20, 2009

(54) APPARATUS AND METHOD FOR MEASURING STRUCTURAL PARTS

(75) Inventors: Cordt Erfling, Paderborn (DE); Rainer Lübbers, Paderborn (DE); Wilfried Rostek, Paderborn (DE); Tim Finke, Bielefeld (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 135 days.

(21) Appl. No.: 11/723,671

(22) Filed: Mar. 21, 2007

(65) Prior Publication Data

US 2007/0223009 A1 Sep. 27, 2007

(30) Foreign Application Priority Data

Mar. 22, 2006 (DE) .................. 10 2006 013 584

(51) Int. Cl.
*G01B 11/14* (2006.01)
(52) U.S. Cl. ...................... 356/625; 356/639
(58) Field of Classification Search ......... 356/625–640, 356/601–613, 5.01–5.04, 4.01; 382/154, 382/141, 106, 199, 203, 285, 286, 149, 151, 382/108, 254; 348/86–87, 94–95, 125–130; 345/419; 250/559.22–559.33
See application file for complete search history.

(56) References Cited

U.S. PATENT DOCUMENTS 5,028,799 A * 7/1991 Chen et al. ............ 250/559.23
6,064,759 A 5/2000 Buckley et al.
6,480,287 B2 11/2002 Lee et al.
6,940,608 B2 * 9/2005 Sakita ..................... 356/605
2002/0024677 A1 2/2002 Metcalfe et al.
2005/0046871 A1 * 3/2005 Martinschledde et al. ... 356/601
2006/0232787 A1 10/2006 Hoffmann et al.

FOREIGN PATENT DOCUMENTS

| DE | 3817321 A1 | 5/1989 |
|---|---|---|
| DE | 40 26 206 A1 | 2/1992 |
| DE | 43 01 538 A1 | 7/1994 |
| DE | 101 63 534 A1 | 7/2003 |
| DE | 10313191 A1 | 10/2004 |
| DE | 103 41 042 A1 | 3/2005 |
| DE | 103 39 499 A1 | 4/2005 |
| EP | 0 540 343 A1 | 5/1993 |

* cited by examiner

*Primary Examiner*—Gregory J Toatley, Jr.
*Assistant Examiner*—Tri T Ton
(74) *Attorney, Agent, or Firm*—Birch, Stewart, Kolasch & Birch, LLP

(57) ABSTRACT

This present invention relates to an apparatus for measuring structural parts which includes a measuring system having at least two sensors for optoelectronic scanning of such a structural part wherein said part and said sensors are movable relatively to each other along a shifting path and wherein said sensors are provided with a radiation source directed to a surface of the structural part and with a receiver, characterized by the fact that at least one sensor is an area sensor adapted to scan one surface section of the structural part (2) in each measuring time interval and/or that at least one sensor is a line sensor adapted to detect one profile line of said structural part in each measuring interval.

23 Claims, 5 Drawing Sheets

APPARATUS AND METHOD FOR MEASURING STRUCTURAL PARTS

FIELD OF THE INVENTION

This present invention relates to an apparatus for measuring structural parts which comprises a measuring system having at least two sensors for optoelectronic scanning of such a structural part wherein said part and said sensors secured to a support means are movable relatively to each other along a shifting path and wherein said sensors are provided with a radiation source directed to a surface of the structural part and with a receiver means.

The invention also relates to a method for measuring a structural part wherein at least two sensors of a measuring system are adapted to scan the surface of said structural part and are relatively movable along said latter during a measuring operation.

BACKGROUND INFORMATION

Prior known from DE 100 62 251 C2 is an apparatus for measuring structural parts wherein a height profile of said structural part is determined by means of a laser type triangulation measuring system. This prior art apparatus is however restricted to determination of height images of a plane and/or cambered surface of structural parta.

DE 40 25 682 C2 discloses an apparatus for measuring structural parts wherein the height profile of an elongated structural part is determined by means of a laser type triangulation measuring system. This laser type triangulation measuring system is fitted with one only triangulation sensor which is directed to one only surface of said elongated structural part and which permits to measure said structural part in both a vertical and a horizontal direction while said part is moving relatively to said laser type triangulation measuring unit. The laser type triangulation measuring system is comparatively complex and only capable of measuring a structural part from just one side.

Prior known from DE 38 17 321 A1 is an apparatus for measuring structural parts which comprises a triangulation measuring system with two triangulation sensors for optoelectronic scanning of said structural part. The triangulation sensors are fitted on one common support means in one common horizontal scanning plane and positioned in vertical relation to a shifting direction along which the structural part is moved in the course of the measuring process. During said continuous shifting of the structural elements along a production line it is that the triangulation sensors each receive a measuring signal at a predetermined time which is then passed on to an electronic evaluator unit in which the coordinates of predetermined reference points are computed on the basis of a given triangulation relation. This prior apparatus is however affected by the drawback that the measuring system sensors need to be directed to already known reference points of the respective structural part. Complete measurement of the structural part's surface structure is hence not reliably ensured.

It is an object of this present invention to provide an apparatus and a method for measuring structural parts that permit non-contact measurement of three-dimensional geometries of structural parts with a minimum of effort and expense.

SUMMARY OF THE INVENTION

To achieve this object the apparatus according to the present invention is in conjunction with the preamble of Patent Claim 1 characterized by the fact that at least one of the sensors is provided in the form of an area sensor adapted to scan one surface section of the structural part in each measuring time interval and/or that at least one of the sensors is a line sensor adapted to sense one profile line of said structural part in each such interval.

The particular advantage afforded by the apparatus according to this present invention resides in that by providing the sensors in the form of area and/or line sensors the information content per scan or measuring run is increased. A three-dimensional surface profile of the structural part may be advantageously scanned and computed with the sensors preferably so arranged relatively to each other and/or to the structural part that any surface section of the structural part exposed to the sensors may be detected in the absence of shadow effects.

According to a preferred embodiment of the invention there is an adjusting mechanism provided with the sensors such that these sensors are pivotable about two orthogonal swivel axes independently of each other. The sensors may for instance each be arranged to pivot about one horizontal and one vertical axis. This ensures that especially undercuts of a structural part may be scanned and detection of the complete surface profile and/or surface contour of the structural part will be ensured.

In an improvement of this invention it is possible also to arrange the sensors in a three-dimensionally movable robot arm each such that the sensor may be moved into any desired position relative to the structural part. The actual coordinates of the sensors and/or the orientation of the sensors during the measuring operation are processed in such a way in the evaluator unit along with the measuring data obtained that one single surface profile image of the structural part is generated.

Another improvement of the invention provides for the area sensor to be designed as an interference or LIDAR sensor. The interference sensor is designed such that on the basis of interferometry a distance is measured and a length is represented as a multiple of the wavelength of a coherent light from the light source of the sensor. Laser light and preferably laser light of an He—Ne laser is preferably used for this purpose. The LIDAR sensor emits light which is reflected by the surface of the structural part. Measuring the light radiation runtime permits to determine the distance of the structural part from the sensor while by superimposing all of the measuring data the entire surface of the structural part may be scanned.

To achieve the above defined object the apparatus method according to the present invention is characterized by the fact that the sensors are adapted to simultaneously scan a plurality of signals representing different surface sections of the structural part, said detection of measuring signals being accomplished in synchronism with a shifting time interval of a shifting path through which the structural part is intermittently moved relatively to the sensors during the measuring operation.

The particular advantage afforded by the method of this present invention resides in that activation of the sensors in synchronism with a shifting cycle by which the structural part is shifted relatively to the measuring apparatus will enable reliable and complete detection of the member's surface profile to be ensured.

A preferred embodiment of the method provides for detection and/or reception of an emitted radiation signal takes place while the structural part and/or the sensors are at standstill so that detection of the surface contour of the structural part will be ensured in the absence of measuring errors.

It is preferable that intermittent shifting of the structural part relative to the measuring apparatus be effected in an equidistant way and/or at a constant cycle rate such that as seen in shifting direction a forward and a rearward surface section of the structural part is detected. This ensures that undercuts also in the forward or rearward portion of the structural part will be measured.

Further advantages of this present invention are as disclosed in the subclaims.

BRIEF DESCRIPTION OF THE DRAWINGS

Exemplary embodiments of the invention will now be described in greater detail with reference to the drawings in which.

DETAILED DESCRIPTION

Figure 1:
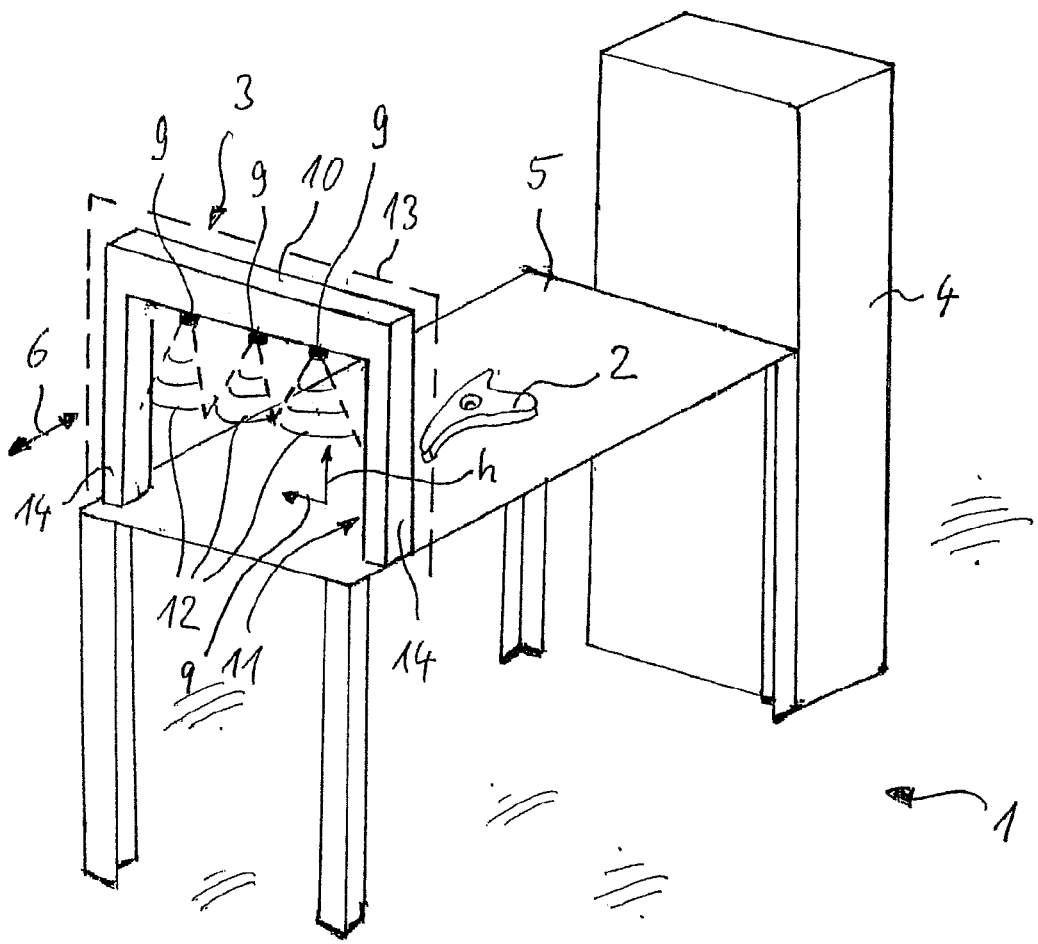
FIG. 1 is a perspective view of an apparatus for measuring structural parts according to a first embodiment of the invention.

The apparatus 1 of the present invention for measuring structural parts 2 is adopted in the production of such parts to define the geometry of the finished part.

The apparatus 1 of this present invention substantially comprises a triangulation measuring system 3, an evaluator unit 4 and a support plane 5 on which the structural part 2 to be measured is placed. The triangulation measuring system 3 may for instance be of laser type.

The support plane 5 for structural parts 2 is provided in the form of a table which is stationary and vibration damped. The support table is for instance 1.5 m×0.6 m in size.

The triangulation measuring system 3 is disposed in a horizontal shifting direction 6 and shiftable relatively to the support table 5. The triangulation measuring system 3 may be fitted with a drive means (not shown) for performing its shifting movements.

In a first embodiment of the invention according to FIG. 1 the triangulation measuring system 3 comprises three equidistant triangulation sensors 9 which are secured to a horizontal cross member 10 of a shiftable support 11 cross to the shifting direction. The triangulation sensors 9 are attached to the underside of said cross member 10 and by each of their laser beams 12 cover a vertical measuring plane 13 which extends perpendicular to the horizontal shifting direction 6 and perpendicular to the support table 5.

The height of the cross member 10 is determined by the length of vertically extending legs 14 of the support 11 which are each disposed between the ends of the cross member 10 and the support table 5. The height of said legs 14 may be 0.2 m for instance. The support 11 hence constitutes a movable bridge and/or in combination with the triangulation sensors 9 form a movable optical curtain through which the structural part 2 is passed in horizontal shifting direction 6. The structural part 2 may take any position on the support table 5. The arrangement of the triangulation sensors 9 is such that both the height profile in the direction h and the cross profile in the direction q is detected in the vertical measuring plane 13. A complete contour measurement of each structural part 2 is hence ensured in a two-dimensional sense while a complete three-dimensional profile measurement of the structural part 2 is enabled by complete detection of said structural part 2 by the triangulation sensors 9 due to said continuous shifting or at short intervals intermittent shifting of said part.

The evaluator unit 4 makes a comparison between the actual data of the structural part 2 as measured and the scheduled data of said part 2 as stored in said evaluator unit 4. The scheduled data of the structural part 2 represent a reference model thereof that with the aid of CAD technology, for instance, is three-dimensionally available in electronic form. Associated with said reference model may be reference geometries (holes, cylinders, edges, contours) on the basis of which the actual data obtained may be adjusted to cope with the reference model. A second method for model adjustment is to adopt a best-fit computation permitting measurement of a structural part 2 to be easily carried out with said member 2 placed on the support plane 5 in any random position. An evaluation routine of the evaluator unit 4 permits automatic adaption of the actual-state model to the reference model while overlapping the prominent reference point of the reference model with a corresponding prominent reference point of the actual-state model.

The evaluator unit comprises a check routine adapted to check preselectable geometric properties of the actual-state model for coincidence with the reference model. This particularly permits to check up on production related (toleranced) properties of the structural part 2. This geometric checkup may for instance be carried out respectively for hole spacings, hole diameters, certain radii and shape accuracy of a structural part 2.

The evaluator unit 4 is adapted to compute 7 any deviations of the actual-state model from the reference model which are visualized as customary on an operator-controlled monitor and/or edited by means of a printer. Visualized in particular is any condition exceeding a predetermined error threshold that may require to change the setting of the production plant concerned.

The evaluator unit 4 further comprises a memory unit in which the data obtained by the evaluator are stored. This ensures that the structural parts 2 may be traced back as to the location of their production facility and their production time.

Figure 2:
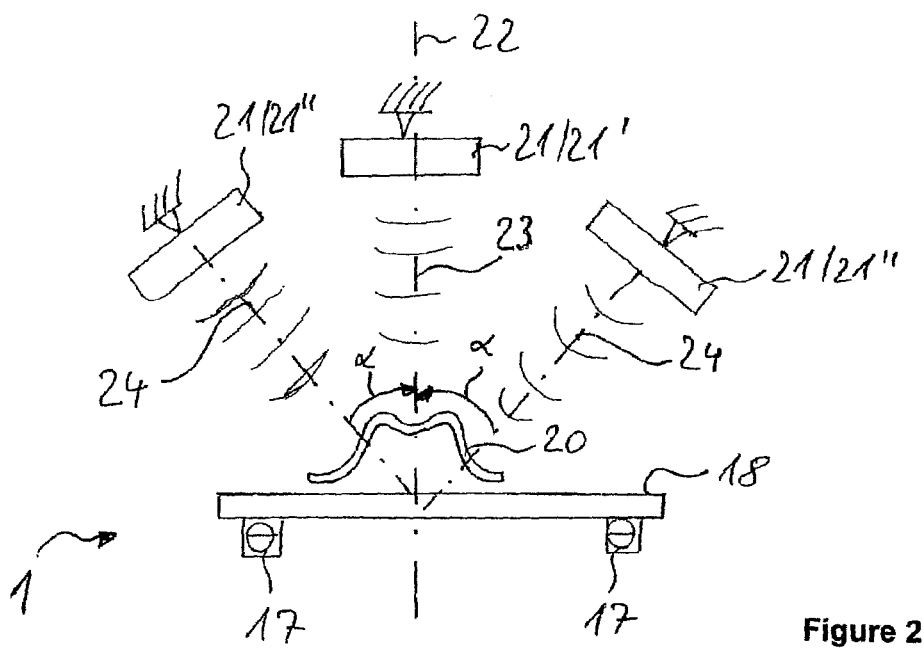
FIG. 2 is a vertical section through such an apparatus according to a second embodiment of the invention.

A second embodiment of the apparatus 1 according to FIG. 2 provides for a structural part 20 to be positioned on a movable support table 18. This table 18 carrying the structural part 2 is moved in horizontal shifting direction 6 by a drive means and guided by a precision type guide 17. Said support table 18 may be provided in the form of a belt conveyor also.

The triangulation measuring system 3 outlined in FIG. 2 comprises at least three triangulation sensors 21 which are relatively offset both in regard to their height h and their orientation toward the structural part 2. A triangulation sensor 21' in the middle is disposed in a transversal center plane 22 of the support table 18 above said latter. An optical axis 23 of the intermediate triangulation sensor 21' extends perpendicularly to the support table 18 and in the vertical measuring plane 13. Optical axes 24 from outer triangulation sensors 21" disposed at both sides of said intermediate triangulation sensor 21' each extend under an acute angle relative to the optical axis 23 of the intermediate triangulation sensor 21'.

The intermediate triangulation sensor 21' is level offset in relation to the outer sensors 21".

The fact that the outer triangulation sensors 21" are arranged under an acute angle α permits detection of a cross profile of the structural part 20 in addition to detection of a height profile.

It goes without saying that the triangulation sensors 9, 21, 21', 21" are relatively offset in horizontal shifting direction 6 also. The vertical measuring plane 13 has a certain "thickness" in that case.

The structural part 2, 20 may for instance be a plate member. The measuring accuracy of the triangulation measuring apparatus 3 and/or the resolution thereof may be less than 0.2 mm. The measuring operation can be performed within just one minute though measuring time may be prolonged by the time another measuring operation would take when undercuts are involved.

The reference model and/or the check routines may be stored in a central data server which is in communication with the central evaluator unit 4.

Figure 3:
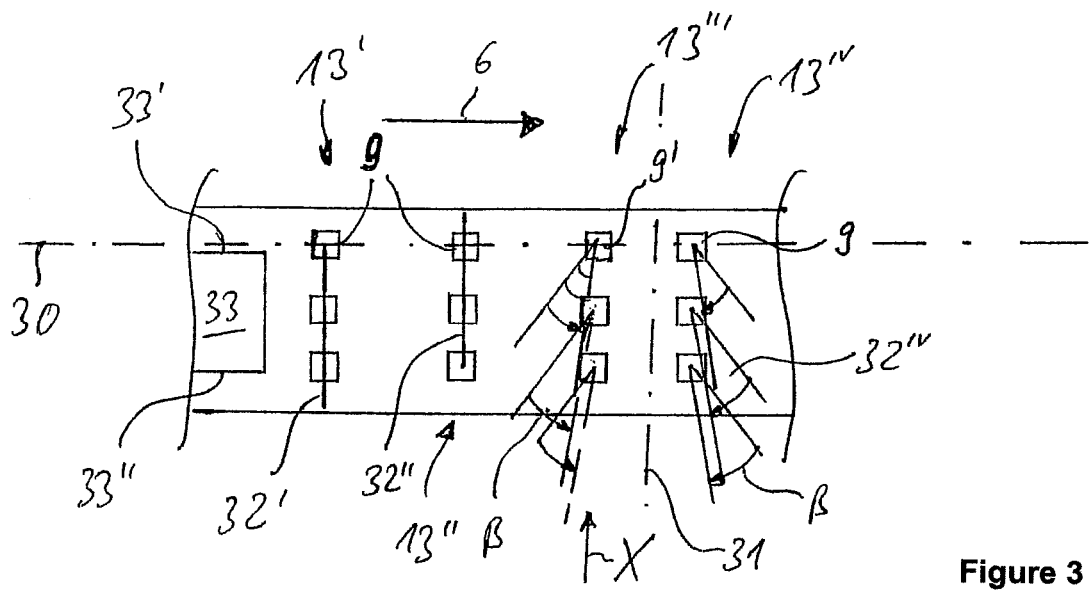
FIG. 3 is a top view of such an apparatus according to a third embodiment of the invention.
Figure 4:
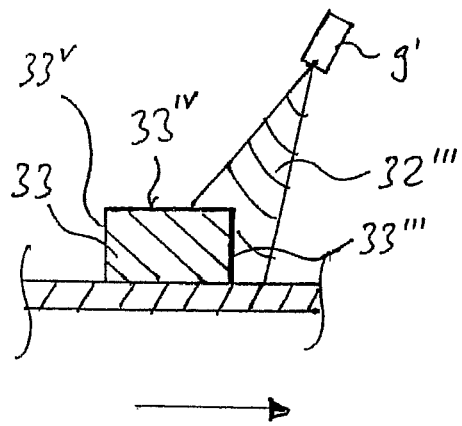
FIG. 4 is a side view of the apparatus according to FIG. 3 in X direction.

An exemplary embodiment of this invention as shown in FIGS. 3 and 4 provides for a a number of measuring planes 13 each comprising a plurality of triangulation sensors which are tandem arranged in rows extending in horizontal shifting direction 6. The triangulation sensors 9 of each measuring plane 13 all have the same spatial orientation/angle setting relative to the structural part 2 and/or a vertical plane 30, 31. The triangulation sensors 9 in a first measuring plane 13' may for instance form a first acute angle to a vertical plane 30, said vertical plane 30 extending parallelly to the shifting direction 6. This acute angle extends in a vertical plane wherein the optical axes of the sensors are oriented to the right cross to the shifting direction 6. This results in a detection and/or scan range 32' which specifically detects a cross profile 33' of a to be measured structural part 33 that extends in shifting direction 6.

Same as the sensors just above described, the triangulation sensors 9 of a second measuring plane 13" in a downstream position as viewed in the shifting direction 6 are likewise disposed in an orientation around an acute angle relative to the vertical plane 30 that extends parallelly to the shifting direction 6. Other than in case of measuring plane 12' are the optical axes of the triangulation sensors 9 of the second measuring plane 1" directed to the left of said vertical plane 30 as referred to the shifting direction 6 such that a detection and/or scan range 32" results which specifically detects a right-hand cross profile 33" extending in the shifting direction 6. The triangulation sensors 9 of the second measuring plane 13" at the vertical plane 30 are in a reflected image arrangement to the triangulation sensors 9 of the first measuring plane.

Third and fourth measuring planes 13''' and 13$^{IV}$ comprise triangulation sensors 9, 9' which are disposed under an acute angle β to a vertical plane 31 extending perpendicularly to the shifting direction 6. The optical axes of the triangulation sensors 9' in the third measuring plane 13''' are oriented and/or disposed opposite to the shifting direction 6, namely under a predetermined angle β of for instance 30°, such that a detection/scan range 32''' opposed to the shifting direction 6 is obtained. This permits to specifically detect a forward cross profile of the structural part 33 in shifting direction 6 besides an upper height profile 33$^{IV}$. This means that not only vertical flanks of the structural part 33 can be detected in shifting direction 6, but also steep flanks that extend transversely to said shifting direction 6.

The sensors 9 of the fourth measuring plane 13$^{IV}$ which referred to the vertical plane 31 are in reflected image arrangement relative to the triangulation sensors 9 of the third measuring plane permit to provide and obtain a detection range 32$^{IV}$ which specifically permits to scan a rear cross profile 33 of the structural part 33.

By means of said triangulation sensors 9, 9' appropriately oriented in said measuring planes 13', 13", 13''' and 13$^{IV}$ it is possible to detect the complete geometry of structural part 33. The apparatus of this present invention is of a comparatively small width not extending beyond the longitudinal marginal edges of the support plane 5.

A further measuring plane (not shown) may be alternatively provided in addition to said measuring planes 13', 13", 13''', 13$^{IV}$ whose optical axes extend vertically downward. This arrangement permits to detect comparatively deep "valleys" of a structural part 33 which cannot be detected by the inclined triangulation sensors 9 of measuring planes 13', 13", 13''', 13$^{IV}$ due to shadowing.

In the exemplary embodiments heretofore described, the triangulation sensors 9 in each of the measuring planes 13', 13", 13''', 13$^{IV}$ are positionally offset cross to the shifting direction 6. The triangulation sensors 9 in different measuring planes 13', 13", 13''', 13$^{IV}$ are offset along the shifting direction 6.

Alternatively it is possible also to dispose triangulation sensors 9 of the same measuring plane with different orientations relative to the vertical plane 30 and/or the vertical plane 31.

According to an alternative embodiment of the invention may the number of measuring planes be restricted to just two such planes. The triangulation sensors 9 in a first measuring plane may be arranged under an acute angle to a first vertical plane and/or to a second vertical plane which is disposed in an orthogonal relation to said first vertical plane. It is preferred that the triangulation sensors 9 in the same measuring plane 13 be tilted twice, namely on the one hand under an acute angle around the first vertical plane and on the other hand under an acute angle around the second vertical plane. At least one triangulation sensor 9 of the second measuring plane may as well be tilted twice in which case the orientation of at least one triangulation sensor of the second measuring plane in opposite direction to a respective sensor 9 of the first measuring plane is tilted under a preferably identical acute angle to the vertical plane. The vertical planes may for instance be provided as vertical and/or horizontal midplanes. The first measuring plane may for instance be positioned in front of the cross member 10 and the second measuring at the rear of said member 10. The first row of measuring units and the second row also may be arranged on a carrier plate which is fixedly or movably disposed on the front or the rear face of the cross member 10, for instance.

According to one aspect of this invention the triangulation sensors in one and the same measuring plane operate in different wavelength ranges with detection and/or computation of a structural part being effected in a plurality of individual coordinate systems each associated with the triangulation sensors. The number of triangulation sensors depends on the size and geometry of the structural part to be measured. It is hence possible, for instance, that a first triangulation sensor of the first measuring plane operates in a wavelength range of 620 nm, a second sensor of that same measuring plane in a 640 nm wavelength range and a third sensor of a like measuring plane in the range of 660 nm. The image data in each case obtained by the sensors (actual data) are combined in one common overall coordinate system of the evaluator unit and then compared with the scheduled data of a CAD model or a reference model of a structural part that has been previously established by means of the triangulation sensors. Any undesirable mutual interference of the measuring result in a measuring plane due to overlaps in the various sections of a structural part as detected by the individual sensors will be advantageously avoided this way.

This effect may even be enhanced by fitting suitable color filters to the triangulation sensors.

Alternatively it is possible to use triangulation sensors on a structured-light or photogrammetric basis and to provide the triangulation sensors with 3D cameras adapted to evaluate flash runtimes.

An alternative embodiment of the invention may provide for a structural part to be passed through the measuring apparatus or the measuring planes, respectively. The here obtained data are then combined into an overall model in the evaluator unit.

The triangulation sensors are preferably disposed in a calibrated arrangement and in fixed positions relative to one another.

Figure 5:
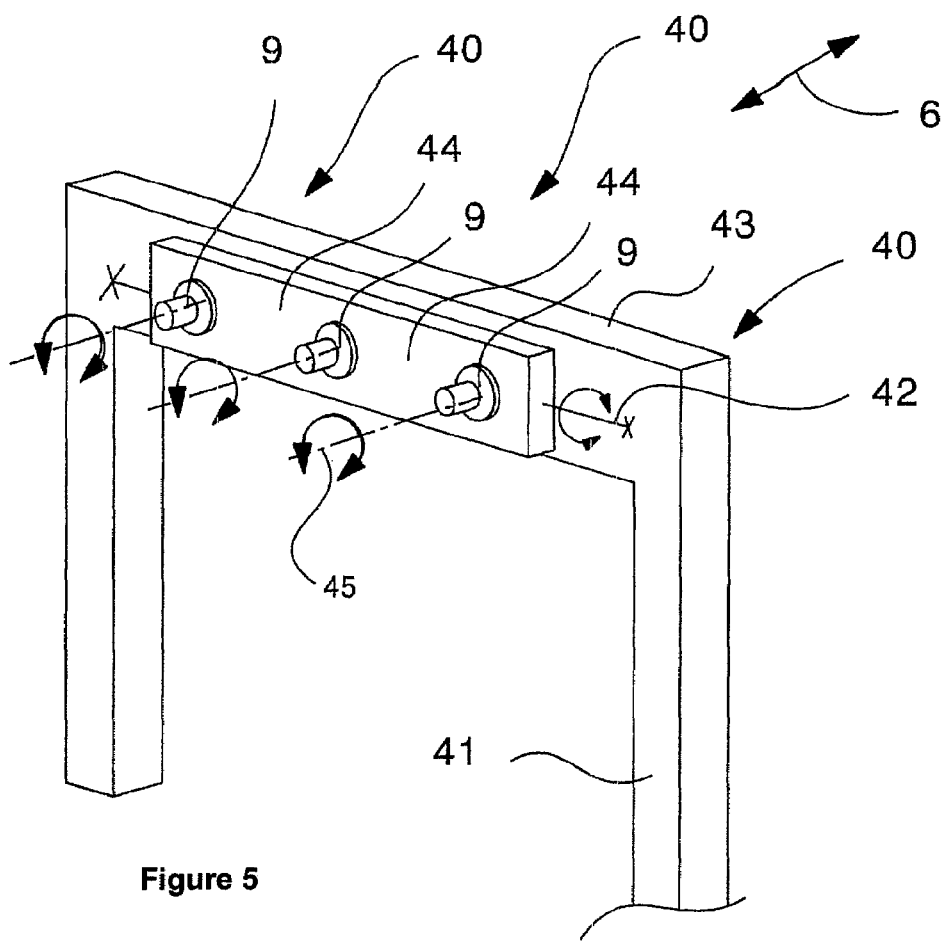
FIG. 5 is a perspective view of such an apparatus according to a fourth embodiment of the invention.
Figure 6:
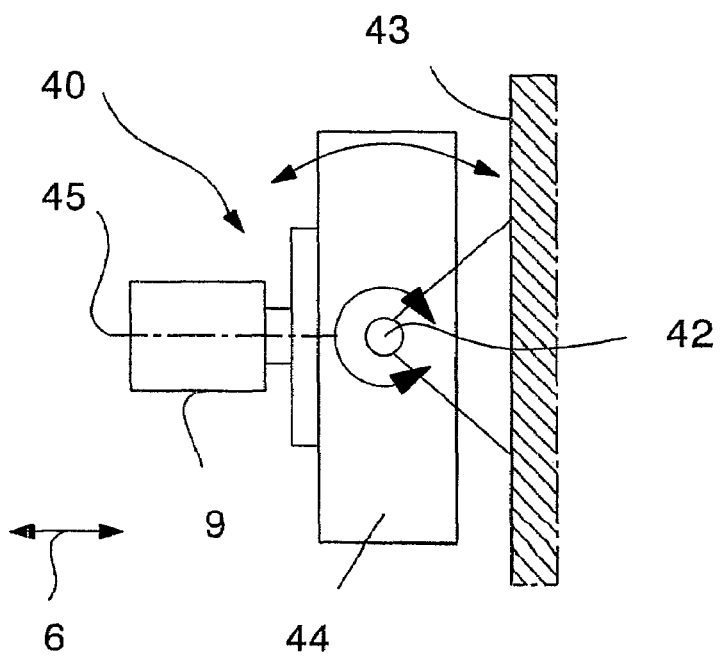
FIG. 6 is a side view of the apparatus according to FIG. 5.

A further embodiment of this invention according to FIGS. 5 and 6 provides for a support means 41 movable in shifting direction 6 which in addition to upright columns comprises a cross member 43 that connects to the upper ends of said columns. A support plate 44 carrying three triangulation sensors 9 is provided along a vertical wall of said cross member 43 and is pivot-able about a longitudinal axis 42 of the cross member 43. An adjusting device 40 is for that purposes fitted with a stepper motor (not shown) by means of which the triangulation sensors 9 can be automatically adjusted in synchronism to cope with scheduled data given by a reference model of the structural part 2. This permits to set and fix the orientation of the triangulation sensors 9 with respect to the structural part 2 on the basis of said scheduled data such that the actual geometry of the height and the cross profiles of the structural element 2 may be optimally determined.

In addition, the adjusting device 40 may be provided with adjusting means for pivoting the triangulation sensors 9 about a swivel axis 45 extending perpendicularly to the longitudinal axis 42 of the cross member 43. Said swivel axis 45 preferably extends in horizontal direction. The orientation and/or position of the triangulation sensors 9 relative to the structural part 2 may be improved this way. A stepper motor may be provided as adjusting means for each of the sensors 9 which are turned discretely and preferably in equidistant movement steps.

An alternative embodiment provides for the adjusting means of the support plate 44 and the individual sensors 9 to be designed such that plate 44 and/or sensors 9 are continuously adjustable around the longitudinal axis 42 or the swivel axis 45, respectively. Servomotors may be used for that purpose.

In a modification of the apparatus according to the present invention it is possible to have only the position and the dimensions of the structural part 2 assessed in a first general-information scan run with the triangulation sensors 9 retained in their initial position. A second main scan run is performed in a second step with the triangulation sensors 9 automatically adjusted to the structural part 2 in compliance with the scheduled data of the reference model 2 to determine the actual data of said structural part 2. In that case, the orientation of the triangulation sensors 9 is dynamically adapted to the scheduled data. Determination of the height and cross profiles of the structural part 2 can be further improved this way.

An alternative modification of the apparatus may provide for adjusting means to operate the adjusting device 40 itself such that only the position and the dimensions of a structural part 2 will be assessed while ignoring the scheduled data thereof whereas the measuring point data (actual data) of said member 2 will be detected in a second main scan run with the triangulation sensors 9 either in stationary arrangement or in movement.

The embodiment of the apparatus shown in FIGS. 5 and 6 affords the advantage of improved and especially faster scanning of a structural part 2. The triangulation sensors 9 will preferably be provided as video sensors such that the position and orientation of a structural part 2 may be assessed in a comparatively short time.

Figure 7:
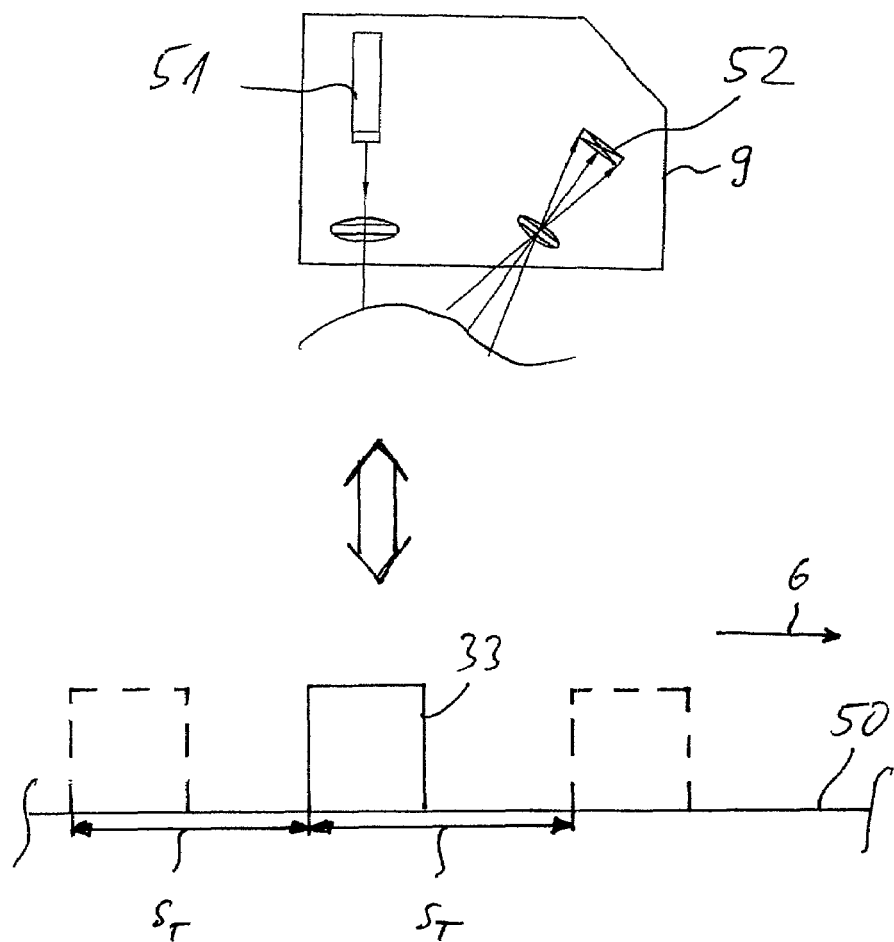
FIG. 7 is a schematic side view of the measuring apparatus showing how the structural part is in shifting direction along an equidistant shifting interval.
Figure 8:
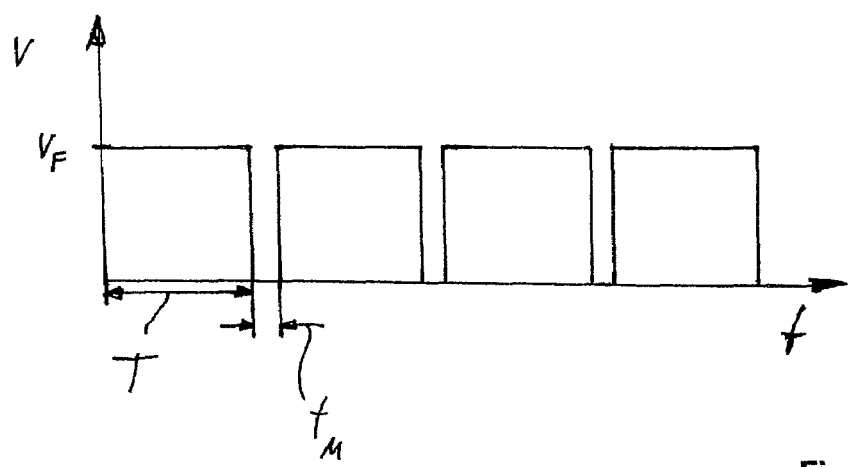
FIG. 8 is a speed/time diagram of a belt conveyor carrying the structural part.

FIG. 7 illustrates in greater detail the measuring operation performed by the measuring apparatus shown in FIGS. 5 and 6. It be assumed in this conjunction that the support 41 carrying the sensors 9 is rigidly arranged while the structural part 33 on a belt conveyor 50 is intermittently advanced in the shifting direction 6. The structural part 33 is moved relatively to the sensors 9 by a pulse controlled belt conveyor 50 wherein on the one hand the structural part 33 is by a shifting stroke $S_T$ moved at a constant conveying speed v during a comparatively long shifting time interval T and wherein on the other hand the sensors 9 are activated during a comparatively short measuring time interval $t_M$ for detection of a measuring signal. The duration of the shifting time interval T or the conveying speed v, respectively, are dependent on the geometry of the structural part 33 and/or on the distance of said structural part 33 from the sensors 9. Shifting time interval T and/or conveying speed v will be selected no greater than absolutely necessary to make sure that the number of surface areas $33'''$, $33^{IV}$, $33^V$ of a structural part 33 as detected by the sensors 9 are sufficient to obtain complete measuring information on the surface contour of said structural part 33. The detection proper takes place during the measuring time interval $t_M$ while the structural part 33 is at standstill.

The sensors 9 are relatively arranged under a fixed predetermined angle that may depend on a structural part pattern such that complete detection of the surface $33'''$, $33^{IV}$, $33^V$ of the structural part (in the absence of shadow) will be ensured.

Orientating the sensors 9 relative to a structural part 33 takes place at the beginning of a measuring operation and any desired orientation relative to the structural part 33 can be set due to the fact that the individual sensors 9 are pivotable about a horizontal and a vertical axis 45, 42. This adjustment or orientation, respectively, of the sensors 9 can be effected automatically on the basis of structural part geometry patterns integrated in a measuring routine. This requires that such structural part geometry patterns must previously have been stored in a data base.

As will be seen from FIG. 7, a sensor 9 consists of a radiation source 51 on the one hand and a receiver means 52 on the other hand. The radiation source 51 is a laser light source and the receiver means 52 is a CCD camera in this present embodiment. Computation of the surface contour of a structural part 33 is effected by the triangulation method.

In a further not shown embodiment of the present invention it is possible also to combine one or several area sensors with one or several line sensors (triangulation sensors) whereby the variability of the measuring apparatus may be further enhanced to cope with any geometry of a structural part.

For example, the area sensor may be provided as an interference or LIDAR sensor. The interference sensor detects a surface section $33'''$, $33^{IV}$, $33^V$ by an interference process wherein its distance from the structural part 33 is determined as a multiple of the wavelength of the emitted light. Said emitted light should preferably be a laser light. The beam sent out by a laser impinges a semipermeable beam splitter where it is split up into two beams of equal intensity of which one undergoes a right-angle deflection. Both split beams are reflected by a triple mirror each and then reunited in the beam splitter. One of the triple mirrors is shifted by an amount equal to the measuring length while the other triple mirror and the beam splitter remain stationary during the measurement. On clearing the beam splitter, the light intensity at a fixed point in the beam is dependent on the path difference as involved and hence on the phase difference between the split beams. A change of this difference due to displacement of the one triple mirror results in a periodic intensity change there. These light/dark pulses are transformed into electric pulses by a photoelectric pickup and recorded by an electronic counter.

The LIDAR sensor detects the surface of a structural part 33 via light runtime measurements.

According to a further embodiment of the present invention the sensors 9 can each be mounted on a robot arm which is three-dimensionally movable and which moves the sensor 9 into a predetermined space position in compliance with given space coordinates and/or dependent on the geometry of the structural part 2 whereby a measurement can be performed from any random location. A plurality of measurements will be performed in different space coordinates.

Figure 9:
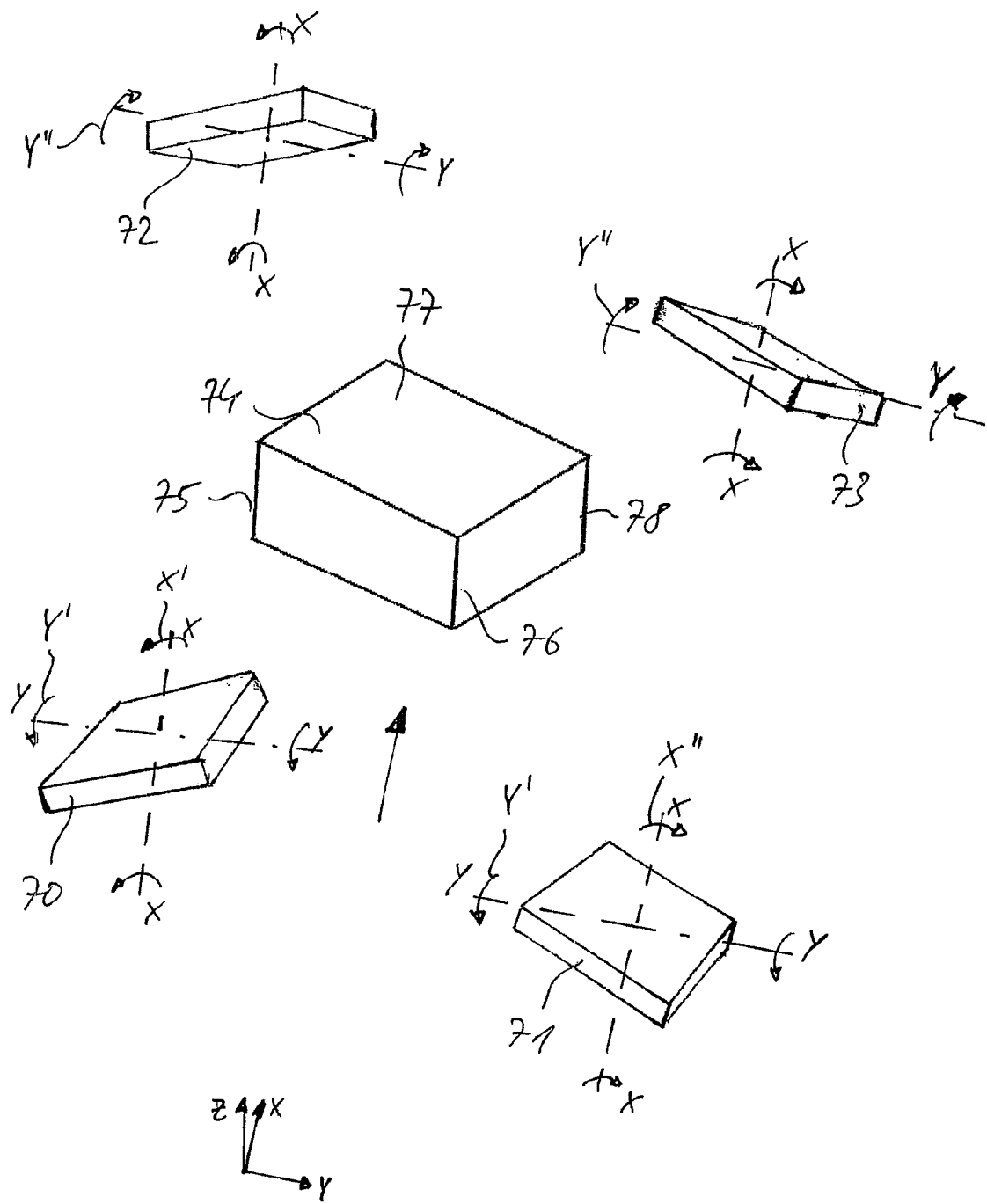
FIG. 9 is a schematic perspective view of the differently oriented sensors of the apparatus a seen under an angle from above.

A further embodiment of the invention as shown in FIG. 9 includes four identical sensors 70, 71, 72, 73 arranged in different orientations relative to a structural part 74 which is movable along the shifting direction 6.

The sensors 70, 71, 72, 73 may be provided as area sensors or line sensors.

As will be seen from FIG. 9, the sensors 70, 71, 72, 73 are each tilted with reference to a first centerline (x-centerline) and a second centerline (y-centerline), with said x-centerline and said y-centerline each extending through the gravity center of the sensors 70, 71, 72, 73. The x-centerline and the y-centerline are each positioned orthogonally to one another on the one hand and to a z-axis extending perpendicularly to the support plane 5 on the other hand.

The sensors 70, 71, 72, 73 are each oriented toward different corner areas 75, 76, 77, 78 of the structural part 74 such that detection of the entire surface of the structural part 74 is ensured. Preferably, at least one of the sensors 70, 71, 72, 73 is positioned transversely (in y-orientation) to the shifting direction 6 in such a way that it will reliably scan the very corner area 75, 76, 77, 78 of the structural part 74 to which it is allocated. The sensor 70 associated with a left hand rear portion 75 of the structural part 74 is preferably arranged on the left side as viewed in shifting direction 6 of the apparatus or cross member, respectively.

As will be seen from FIG. 9 there are two first sensors 70, 71 disposed under a mirror reflected first tilt angle x' and/or a second tilt angle x" referred to the respective x-centerline of said sensors 70, 71. These sensors 70, 71 are tilted about the first tilt angle x' of sensor 70 and opposed to the second tilt angle x" of sensor 71 around the x-centerline such that side areas of the structural part 74 which are opposite to each other cross to the shifting direction will be scanned completely.

The first sensors 70, 71 are disposed under an identical tilt angle y' with respect to the y-centerline and inclined oppositely to the shifting direction from a horizontal zero plane.

The two second sensors 72, 73 are disposed under a first tilt angle y" with reference to the y-centerline, i.e. inclined forward in shifting direction 6, such that said fourth tilt angle y" is substantially in a reflected image position to of the third tilt angle y'. Said second sensors 72 and 73 are in a reflected image position to each other around the first tilt angle x' and the second tilt angle x", respectively, as referred to the x-centerline, and same as in the case of the first sensors 70, 71 are inclined outwardly around the tilt angles x' and x", respectively.

The tilt angles x', x", y', y" are acute angles preferably in the range 30° to 45°.

The sensors 72 and 73 are oriented toward the corner area 77 and 78, respectively, of the structural part 74.

As shown in FIG. 9, the first sensors 70, 71 and the second sensor 72, 73 may be relatively offset in shifting direction 6. Alternatively may the first sensors 70, 71 and the second sensors 72, 73 also be attached to the common cross member 10 of the apparatus.

The invention claimed is:

1. Apparatus for measuring structural parts which comprises a measuring system having at least two sensors for optoelectronic scanning of such a structural part wherein said part and said sensors are movable relatively to each other along a shifting path and wherein said sensors are provided with a radiation source directed to a surface of the structural part and with a receiver means, characterized by the fact that at least one sensor is an area sensor adapted to scan one surface section of the structural part in each measuring time interval and that at least one sensor is a line sensor adapted to detect one profile line of said structural part in each measuring interval, characterized by the fact that at least two sensors are disposed under opposed tilt angles (x', x", y', y") with respect to a first centerline (x-centerline) and to a second centerline (y-centerline) thereof, wherein the shifting path extends orthogonally to said first centerline (x-centerline) and said second centerline (y-centerline) of the sensors.

2. Apparatus as set forth in claim 1, characterized by the fact that the sensors are attached to one common support means and that said sensors are disposed in one common sensor plane in a spaced apart relation.

3. Apparatus as set forth in claim 1 or claim 2, characterized by the fact that an adjusting device is associated with the sensors such that the sensors are independently pivotable about two swivel axes which are in an orthogonal relation to each other.

4. Apparatus as set forth in claim 1, characterized by the fact that the sensor is arranged in a space guided robot arm which is three-dimensionally movable.

5. Apparatus as set forth in claim 1, characterized by the fact that the area sensor is an interference sensor or a LIDAR sensor.

6. Apparatus as set forth in claim 1, characterized by the fact that the line sensor is a triangulation sensor.

7. Apparatus as set forth in claim 1, characterized by the fact that four sensors are provided of which two first sensors are arranged under a reflected first tilt angle (x') and second tilt angle (x") referred to the first centerline (x-centerline) thereof and under an identical third tilt angle (y') referred to the second centerline (y-centerline) thereof on the one hand and of which two second sensors are arranged under said reflected first tilt angle (x') and second tilt angle (x") referred to the first centerline (x-centerline) thereof and under an identical fourth tilt angle (y") referred to the second centerline (y-centerline) thereof on the other hand, wherein the fourth tilt angle (y") is disposed in reflected image arrangement to said third tilt angle (y').

8. Apparatus as set forth in claim 7, characterized by the fact that the sensors are oriented to different corner areas of the structural part which extend in a horizontal plane.

9. Apparatus as set forth in claim 6, characterized by the fact that the triangulation sensors are serially arranged in one common measuring plane and preferably cross to the horizontal shifting direction and the triangulation sensors thus serially arranged are offset relatively to one another in shifting direction.

10. Apparatus as set forth in claim 6, characterized by the fact that the triangulation sensors serially arranged in one measuring plane and that the triangulation sensors of a first measuring plane are disposed under a fixed or a variable acute angle relatively to triangulation sensors of an adjacent measuring plane.

11. Apparatus as set forth in claim 10, characterized by the fact that an intermediate triangulation sensor is disposed in the area of a transversal centerline plane of a support plane above said latter wherein the optical axes of said triangulation sensor extend perpendicularly or with a different relative orientation to said support plane.

12. Apparatus as set forth in claim 11, characterized by the fact that on either side of said intermediate triangulation sensor there is one adjacent triangulation sensor provided whose optical axis on the one hand covers a preferably vertical measuring plane in coaction with the optical axis of said intermediate triangulation sensor and on the other hand extends under a preferably variable acute angle to the optical axis of said intermediate triangulation sensor.

13. Apparatus as set forth in claim 11, characterized by the fact that the intermediate triangulation sensor is offset in a vertically upward sense or variable in position relative to outer ones of said triangulation sensors.

14. Apparatus as set forth in claim 1, characterized by the fact that the support plane is retractable and adapted to be repositioned by means of a precision type guide means.

15. Apparatus as set forth in claim 6, characterized by the fact that the triangulation sensors are mounted to one common stationary support means.

16. Apparatus as set forth in claim 6, characterized by the fact that an adjusting device is provided such that the triangulation sensors are each separately movable and are all movable in synchronism relatively to a support means carrying said sensors.

17. Apparatus as set forth in claim 16, characterized by the fact that the adjusting device is provided with a support plate which is mounted to a cross member of a support means and pivotable about a longitudinal axis thereof and which carries the triangulation sensors either in a stationary arrangement or pivotably about a swivel axis extending in an orthogonal direction relative to the longitudinal axis of the cross member.

18. Apparatus as set forth in claim 16, characterized by the fact that the adjusting device is provided with adjusting means in such a way as to enable the triangulation sensors to be oriented or adjusted to the structural part in a continuous or discrete mode, preferably in equal steps.

19. Apparatus as set forth in claim 16, characterized by the fact that the adjusting device is provided with adjusting means adapted to automatically set the sensors to positions that correspond to scheduled data given by a reference model of the structural part and to retain the triangulation sensors in predetermined positions.

20. Apparatus as set forth in claim 16, characterized by the fact that the adjusting device is provided with adjusting means such that the position of the structural part is assessed in a first general information scan performed by the triangulation sensors while these are in a fixed initial position and that in a subsequent second main scan said triangulation sensors are then automatically adjusted in compliance with the scheduled data of the structural part to assess the actual data of said part.

21. Apparatus as set forth in claim 20, characterized by the fact that the adjusting device is provided with adjusting means such that in said first general information scan only the position and the dimensions of the structural part are determined while neglecting its scheduled data and that in said second main scan the actual data of the structural part are assessed with the triangulation sensors either at standstill or in movement.

22. Apparatus as set forth in claim 16, characterized by the fact that the support means and the cross member are movable in a horizontal shifting direction.

23. Apparatus as set forth in claim 6, characterized by the fact that the triangulation sensors are video sensors.

* * * * *